United States Patent
Fox et al.

[15] 3,683,903
[45] Aug. 15, 1972

[54] PLASTIC CAST

[72] Inventors: Daniel W. Fox; Allen Wambach, both of Pittsfield, Mass.

[73] Assignee: General Electric Company

[22] Filed: April 27, 1970

[21] Appl. No.: 32,391

[52] U.S. Cl. ................................................128/90
[51] Int. Cl. ................................................A61f 5/04
[58] Field of Search............................128/90, 83, 89

[56] References Cited

UNITED STATES PATENTS

| | | | |
|---|---|---|---|
| 2,853,067 | 9/1958 | Puharich | 128/90 |
| 2,218,844 | 10/1940 | Lovell | 128/90 |
| 3,421,501 | 1/1969 | Beightol | 128/90 |

OTHER PUBLICATIONS

Condensed Chemical Dictionary, 6th Edition Reinhold Publishing, New York (1962) Pg. 910 cited

*Primary Examiner*—Samuel Koren
*Assistant Examiner*—G. M. Yahwak
*Attorney*—Frank L. Neuhauser, Oscar B. Waddell, Joseph B. Forman, Jon Carl Gealow and Arthur V. Puccini

[57] ABSTRACT

A plastic cast for immobilizing a body member which cast comprises a layer of porous flexible material, preferably a glass fabric, impregnated with a solution of a thermoplastic resin, preferably a polycarbonate in a suitable solvent such as methylene chloride. The cast material may be stored in a rolled tape form in an hermetically sealed container having a sufficient solvent environment to maintain the same in a plasticized state and, in use, is wrapped about the body member in one or more layers over a moisture resistant cushioning layer. When the solvent evaporates the resin becomes sufficently rigid within a short time, usually less than fifteen minutes, to immobilize the member and the rigid cast ultimately becomes completely hardened, usually within less than two hours. The cast is relatively light in weight, mechanically strong, and highly resistant to moisture, and remains hygienic during use so that much less discomfort to the wearer results than from the use of conventional plaster of paris casts.

5 Claims, No Drawings

PLASTIC CAST

BACKGROUND OF THE INVENTION

1. Field of the Invention

This invention relates generally to plastic devices and, more particularly, to a plastic device which is useful in immobilizing parts of the body as, for example, broken limbs and arthritic or sprained joints.

2. Description of the Prior Art

For many years casts used for immobilizing portions of the human body have been fashioned from plaster of paris which is molded so as to encase the body member in question. While such material is relatively low in cost and can be handled fairly easily, its use has many disadvantages. First of all, the material itself is relatively weak mechanically and sufficient strength can be obtained usually only by using an increased wall thickness for the cast material which produces a corresponding increase in weight and additional considerable discomfort for the wearer. Moreover, such material has a relatively low resistance to moisture and even a minimal absorption of water in the cast results in an undesirable softening of the material. Moreover, it is relatively difficult to maintain good hygienic conditions under the cast and irritation of the skin surface and further discomfort to the user results. Such casts are poorly adapted for the circulation of air currents in and around the cast and, additionally, the relatively great bulk of material which is usually found necessary makes the use of normal clothing difficult for the user. Further, the relative opacity of such material to x-rays requires the cast to be removed every time an x-ray examination is required.

In an effort to avoid the disadvantages of conventional plaster of paris casts, other materials such as glass fiber fabrics impregnated with certain cross-linkable resins have been suggested. The cross-linking reactions within such materials, however, must be initiated by the use of radiation having wavelengths in the ultraviolet region of the spectrum. In practical use, the material is wrapped on the body member to be immobilized and the body member then must be exposed to ultraviolet light in an apparatus which is specially constructed for that purpose. Apart from the need for extra equipment in the form of such an ultraviolet light applicator, the materials that have previously been suggested in such applications are apt to be flammable in nature and, thus, their use becomes dangerous under some conditions. Moreover, a further hazard exists in that the user must be subjected to undesirable and, perhaps, excessive exposure to ultraviolet radiation. An additional disadvantage lies in the fact that the laminar structure may have a tendency to de-laminate in use.

SUMMARY OF THE INVENTION

The invention described herein provides for a cast fabricated from an impregnated fabric which cast is relatively light in weight, has good mechanical strength, is highly resistant to moisture, provides for relatively good air circulation, and can be easily applied without the need for any external radiation, or other, equipment. Moreover, the cast can be adequately penetrated by x-rays and the body member, thus, can be x-rayed even after the application of the cast without any disturbing shadows on the x-ray exposure.

The material utilized for the cast of the invention in its preferred form is a porous, flexible, fabric-like material, such as a glass fabric, impregnated with a suitable non-flammable thermoplastic resin that is low in toxicity and which is highly plasticized with a volatile solvent, which impregnated fabric-like material will hereinafter be referred to as the "cast material." The preferred solvent should be non-toxic and non-flammable. In addition, it should be highly volatile, that is, it should have a sufficiently high vapor pressure such that evaporation can readily occur under standard room temperatures and pressure conditions. The cast material, preferably in a rolled tape form, can be stored together with sufficient solvent to maintain the same in a plasticized state in a hermetically sealed container until ready for use. The term "plasticized state" used herein is intended to mean a state in which the cast material is sufficiently pliable, or workable, at room temperature such that it can be readily made to conform to irregular contours. The impregnated material can be supplied or cut into appropriately narrow strips, for example, to form the rolled tape supply and easily can be applied to the body member following removal from the container in a fairly rapid manner similar to the wrapping of an elastic bandage. The drying rate may be reduced and subsequently the working time extended by interleaving a layer of semi-solvent barrier expendable film such as one of the polyolefins, for example, polyethylene or polypropylene. While the cast material is being applied, it remains soft and flexible and can be easily folded, twisted, tucked or spread so that it readily adapts to irregular contours. The cast material also remains somewhat tacky in character and, thus, adheres to itself as it is wrapped in one or more layers about the body member to be immobilized. When exposed to air, the solvent evaporates and the cast hardens in a relatively short time, in some cases in as low as five to fifteen minutes following its application depending on the air flow and temperature characteristics of the ambient atmosphere. A complete hardening and maximizing of the mechanical strength of the cast is achieved in less than two hours as opposed to the two to three day time period required for complete hardening of conventional plaster of paris cast materials.

DESCRIPTION OF PREFERRED EMBODIMENTS

In the cast of the invention, the flexible material preferably is a non-woven or knit fabric which is pliable and which may also be stretchable. Included within the definition of "non-woven fabric" for purposes of the invention is paper having requisite strength and porosity. Preferably, the fabric may be of knitted glass or, alternatively, may be a knitted polypropylene, a polyester, a nylon fabric, or any other suitable fabric capable of impregnation with a solution of a thermoplastic resin. Specific knitted glass tapes which have been successfully used in the invention, for example, are those manufactured by Carolina Narrow Fabric Co., sold as Style Nos. 3281 and 64712.

The particular resin used is not critical and any of a number of thermoplastic resins known to the art would be suitable. Representative examples of suitable materials include polystyrene and its soluble alloys and copolymers, polyacrylates, polycarbonates, polyesters, polyvinyl chloride, polyphenylene ethers including modified polyphenylene ethers such as those modified with polystyrene, and the like. A preferred class of resins is the polycarbonates as they possess desirable solubility and low moisture absorption characteristics, are self-extinguishing to non-flammable, are non-toxic, and possess a desirable balance of mechanical properties.

A solvent is selected that is non-toxic, and relatively volatile so as to provide rapid drying of the cast after application. Numerous solvents are available that possess these characteristics. Solvents which have proved useful in this application include acetone, methylene chloride, ethyl chloride, methylene chloride-acetone mixtures, methylene chloride-trichlorotrifluoro ethane mixtures, methylene chloride-trichloromonofluoromethane mixtures, and dichloromonofluoro-ethane. Methylene chloride is particularly desirable, especially as a non-flammable solvent for polycarbonates.

It should be obvious that the materials listed above are not solvents for all of the enumerated plastics. However, the selection of a suitable solvent for a particular plastic should be well within the skill of the art, especially with the assistance of standard handbooks which list suitable solvents for particular plastics.

Two interrelated factors which determine the quality and ease of handling of the cast material are the ratio by weight of the plastic to fabric and the ratio by weight of the volatile solvent to plastic. If the ratio of the plastic to fabric is too low the fibers in the fabric may not be adequately encapsulated. Where glass fabric is used, there is a tendency for the glass fabric to fray if insufficient plastic is used, a condition which may produce some irritation on the skin. On the other hand, if the plastic to fabric ratio is too high, there is a tendency for the plastic to close the pores of the fabric so that the resultant cast has diminished porosity. Further, excess plastic enhances a tendency for the plastic to adhere to the fingers of the orthopedist during application.

The problem is aggravated if the plastic is excessively plasticized which indicates that the ratio of the volatile solvent to plastic is in excess. When the solvent to plastic ratio is excessive, the plastic dissolves and there is a tendency for the plastic to flow from the fabric when the cast material is in a storage container. If the ratio of the solvent to the plastic is too low the plastic is insufficiently plasticized and proper adhesion and workability is prevented.

In a preferred embodiment of the invention, the plastic selected is an aromatic polycarbonate derived from bisphenol-A, or a copolymer derived from bisphenol-A and tetra halogenated bisphenol-A, or a blend of non-halogenated and halogenated bisphenol-A homopolymers. The ratio of the plastic to fabric when the plastic is polycarbonate and the fabric is glass may vary from 0.25:1 to 1:1, with 0.65:1 to 0.70:1 being preferred. A ratio of the solvent to plastic of about 1:1 is preferred when the solvent is methylene chloride and the plastic is polycarbonate.

Prior to applying the cast material to a body member to form the cast, it may be stored in an hermetically sealed container together with sufficient additional solvent environment to maintain the same in a pliable and stretchable state so that it can easily be manipulated to conform to the body contours when used. In order to avoid any problems of irritation to the skin by the cast materials, a non-absorbent fabric layer can be initially wrapped around the body member to act as a cushion between the skin and the cast material. The choice of material for this cushion layer is also dictated by the desire to maintain rapid drying of casts after immersion in water. Further, to provide maximum safety in use, a non-flammable cushion material is preferred. A preferable fabric for such use would be made of a polypropylene or a flame retardant modified acrylic resin. The cast material which, for example, is fabricated in the form of a relatively narrow tape is then wrapped about the body member over the non-absorbent cushion-layer until a multiple layer configuration is obtained. For a typical arm cast, for example, about five layers of tape is usually found to be sufficient with additional layers being required for larger body portions. Because of the adhesive properties of the cast material, it readily adheres to itself during the wrapping process. The cast material may be cut to the appropriate length when originally stored and may be further cut to any other desired length when used and any remaining material may be re-stored in the sealable container.

The cast reaches a hardened state in a relatively short time, usually less than fifteen minutes, depending upon the flow of air in the vicinity of the cast as well as its temperature. The hardening rate may be generally increased by applying appropriately circulated heated air to the material. Complete hardening is usually achieved in less than 2 hours.

Alternatively, the cast material may be fabricated in the form of a flexible porous knit tubing rather than in the tape form discussed above. Thus, instead of wrapping a tape around the body member, the tubing can be pulled or alternately rolled on over the body portion, such as an arm or leg, in a manner similar to putting on a stocking. The material is sufficiently stretchable to conform to the irregular contours of the body and the tubing may be formed of several layers of material, the number of which is selected to provide sufficient strength for the use desired. Such tubing dries in a manner similar to that discussed above with reference to the strip or tape form.

In a typical example of the use of the invention, a cushion layer of nylon stockinette in a tubular form cut to an appropriate size was placed over an arm member to be immobilized. A cast material comprising a knitted glass fabric, identified above as Style No. 3281, impregnated with a polycarbonate, that is the reaction product of epichlorohydrin and bisphenol-A, in a methylene chloride solvent was cut in a tape form nine feet long and two inches wide. The impregnated material utilized a ratio by weight of dry polycarbonate to fabric of 2:3 and a ratio by weight of solvent to polycarbonate of 1:1. Five layers of such material in a plasticized state were wrapped about the cushion layer (an estimated six to seven layers of the same material would appear to be sufficient for a leg member) and the drying characteristics of such material were such that it reached a sufficiently hardened state so as to be no longer workable at room temperature in less than 10 minutes. Application of heated air can speed up drying.

The cast material with normal room temperature air drying completed the hardening to a full strength rigid state within an additional two hours.

The cast material may be fabricated by utilizing a conventional strip, or tape, coating apparatus in which a continuous web of porous fabric is passed through a solution of a suitable thermoplastic resin composition whereupon the web becomes impregnated with the plastic solution. The tape, as mentioned above, may be a knitted glass fabric tape which is passed through a solution of a polycarbonate thermoplastic resin in a methylene chloride solvent, the concentration of the solution being in a range of 10 to 25 percent by weight of solids. The web material is then partially dried to increase the solids content, cut to a specified length, and suitably rolled into a storage roll. Alternatively, the material may be completely dried by removing substantially all of the solvent therein and the dried material re-plasticized as required by adding sufficient volatile solvent before storage thereof. Subsequently such roll is sealed in a container, such as hermetically sealed glass or metal container, for example, with sufficient residual solvent to permit the material to remain soft and pliable when stored. When the cast material is ready for use, the container is appropriately opened and the cast material easily wrapped upon the body member in the manner described above.

What is claimed is:

1. A method for forming a cast for immobilizing a body member comprising the steps of:

encasing said body member in a moisture resistant cushioning layer;

encasing said cushioning layer with one or more layers of a flexible fabric material impregnated with an aromatic polycarbonate thermoplastic resin, selected from the group consisting of: polycarbonate derived from bisphenol-A; a polycarbonate copolymer derived from bisphenol-A and tetra halogenated bisphenol-A; and, a polycarbonate blend of non-halogenated and halogenated bisphenol-A homopolymers in a volatile solvent sufficient to maintain said impregnated material in a plasticized state, said flexible fabric having a composition selected from the group consisting of glass, polypropylene, nylon and polyester; and drying said impregnated material to permit said solvent to evaporate, whereby said impregnated material becomes rigid during said evaporation to form an immobilizing cast.

2. A method for forming a cast for immobilizing a body member in accordance with claim 1 wherein said solvent is methylene chloride.

3. A material for use as a cast to immobilize a body member comprising:

a. an aromatic polycarbonate thermoplastic resin selected from the group consisting of: polycarbonate derived from bisphenol-A; a polycarbonate copolymer derived from bisphenol-A and tetra halogenated bisphenol-A; and, a polycarbonate blend of non-halogenated and halogenated bisphenol-A homopolymers, b. a volatile solvent dissolving said resin, and c. a flexible porous fabric impregnated with said resin and solvent, said flexible fabric having a composition selected from the group consisting of glass, polypropylene, nylon and polyester.

4. The invention set forth in claim 3 wherein:

a. said polycarbonate resin is the reaction product of epichlorohydrin and bisphenol-A and said solvent is methylene chloride.

5. The invention set forth in claim 3 wherein:

a. said fabric is glass and the ratio of resin to glass is 0.25:1 to 1:1 by weight, b. said solvent is methylene chloride and the ratio of solvent to resin is about 1:1 by weight.

* * * * *